United States Patent [19]

Ritter et al.

[11] Patent Number: 4,631,038
[45] Date of Patent: Dec. 23, 1986

[54] PROTECTIVE CAPSULE

[76] Inventors: Betty J. Ritter; Ronald G. Ritter, both of 1826 S. 139 E. Ave., Tulsa, Okla. 74108

[21] Appl. No.: 700,605

[22] Filed: Feb. 11, 1985

[51] Int. Cl.⁴ .............................................. B63C 9/00
[52] U.S. Cl. ..................................... 441/80; 114/348
[58] Field of Search ................. 114/348, 56; 441/38, 441/87, 67, 78, 80, 104, 86; 280/206; 244/121, 118.6, 140

[56] References Cited

U.S. PATENT DOCUMENTS 3,083,979  4/1963  Boyd ................................. 280/206
3,294,346 12/1966  Summers ........................... 244/121

FOREIGN PATENT DOCUMENTS 1275699 10/1961 France .............................. 244/121

Primary Examiner—Trygve M. Blix
Assistant Examiner—Jesûs D. Sotelo
Attorney, Agent, or Firm—Head, Johnson & Stevenson

[57] ABSTRACT

A safety capsule structure comprising semi-cylindrical half-sections provided with yieldable and buoyant lining secured on the inner periphery thereof, the half-sections being adapted for installation in a boat hull, or the like, for stabilization of the boat structure against capsizing and to provide a flotation force for the boat, the half-sections being further adapted to be secured together along a common longitudinal side edge to provide alternate open and closed positions with respect to a pair of the half-sections, the closed position of the half-sections providing a protective capsule for an occupant for protection of the occupant during hazardous ambient conditions, such as a tornado, or the like.

3 Claims, 6 Drawing Figures

PROTECTIVE CAPSULE

BACKGROUND OF THE INVENTION

1. Field of the Invention

This invention relates to improvements in safety protection devices and more particularly, but not by way of limitation, to a protective capsule for encasing a human during times of possible bodily harm, such as during a tornado, bombing attack, or the like.

2. Description of the Prior Art

Many lives have been lost and much bodily harm or damage has been inflicted throughout the years by catastrophies, such as tornadoes, hurricanes, wartime bombing attacks and the like. Of course, underground shelters, and the like, have been constructed throughout the world for receiving persons during times of imminent danger, or the like, but some catastrophies can occur with little or no prior notice, and the persons open to harm by the catastrophe may or may not be in the vicinity of such a shelter. Some attempts have been made to provide individual bodily protection devices, or for the protection of other valuables, such as shown in the Rosolofsky U.S. Pat. No. 1,119,541, issued Dec. 1, 1914, and entitled "Life Saving Apparatus;" Young U.S. Pat. No. 2,403,203, issued July 2, 1946, and entitled "Heat Shield;" Foss U.S. Pat. No. 2,683,262, issued July 13, 1954, and entitled "Protective Cover;" Luce et al U.S. Pat. No. 2,827,004, issued Mar. 18, 1958, and entitled "Portable A-Bomb Shelter;" Sams U.S. Pat. No. 3,695,507, issued Oct. 3, 1972, and entitled "Survival Bag;" Van Valkenburg U.S. Pat. No. 3,984,142, issued Oct. 5, 1976, and entitled "Portable Enclosure for a Cyclist;" and the Shoberg U.S. Pat. No. 4,077,515, issued Mar. 7, 1978, and entitled "Medical Slide Cast with Hinged Molded Sections." Most of these devices have certain disadvantages, however, in that they are either of an expensive construction, or are inefficient in use.

SUMMARY OF THE INVENTION

The present invention contemplates a novel protective capsule for encasing a human body during times of imminent danger, or the like, and which has been particularly designed and constructed for overcoming the foregoing disadvantages. The novel capsule is essentially a sectional capsule or tubelike container wherein one may fasten himself in one-half by suitable straps, belts, or the like, and close the other half over him. The two half-sections may be latched together in this body encasing position. The outer or inner periphery of the capsule is provided with roll bar-type elements in order to protect the person encased therein as the entire capsule might be tossed about the terrain during a storm, or the like. In addition, the inner periphery of the capsule is lined with a buoyant yieldable material for protecting the person against injury during use of the device, and whereby the entire capsule and contents will float on the surface of a body of water in the event the capsule is deposited in a body of water, or the like. The novel capsule may also be constructed in the form of a simple boat, if desired, wherein preferably two of the half-sections of the boat-capsule may be utilized together for encasing the body of the occupant or occupants of the device. The novel protective capsule is simple and efficient in operation and economical and durable in construction.

DETAILED DESCRIPTION OF THE PREFERRED EMBODIMENTS

Figure 1:
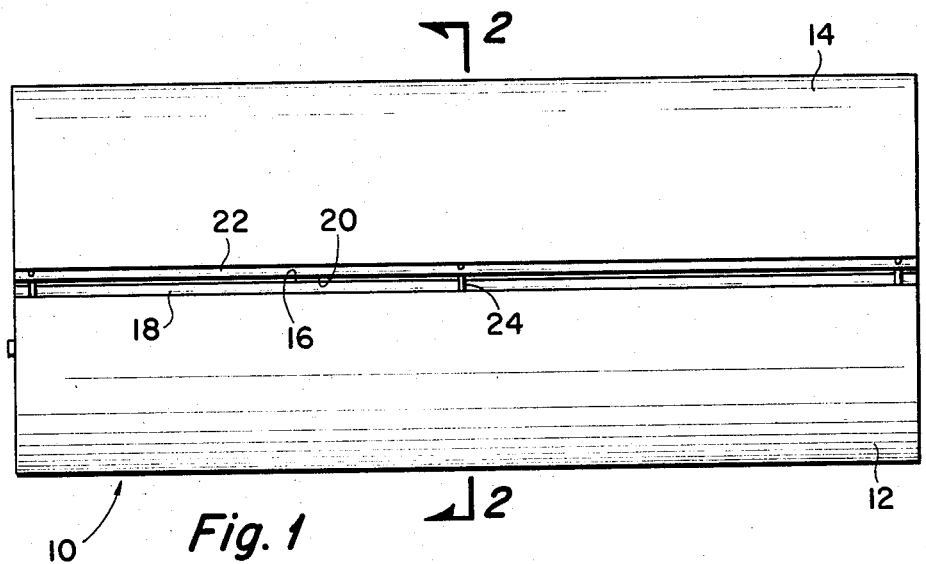
FIG. 1 is a side elevational view of a protective capsule embodying the invention and illustrates the closed position of the capsule.
Figure 2:
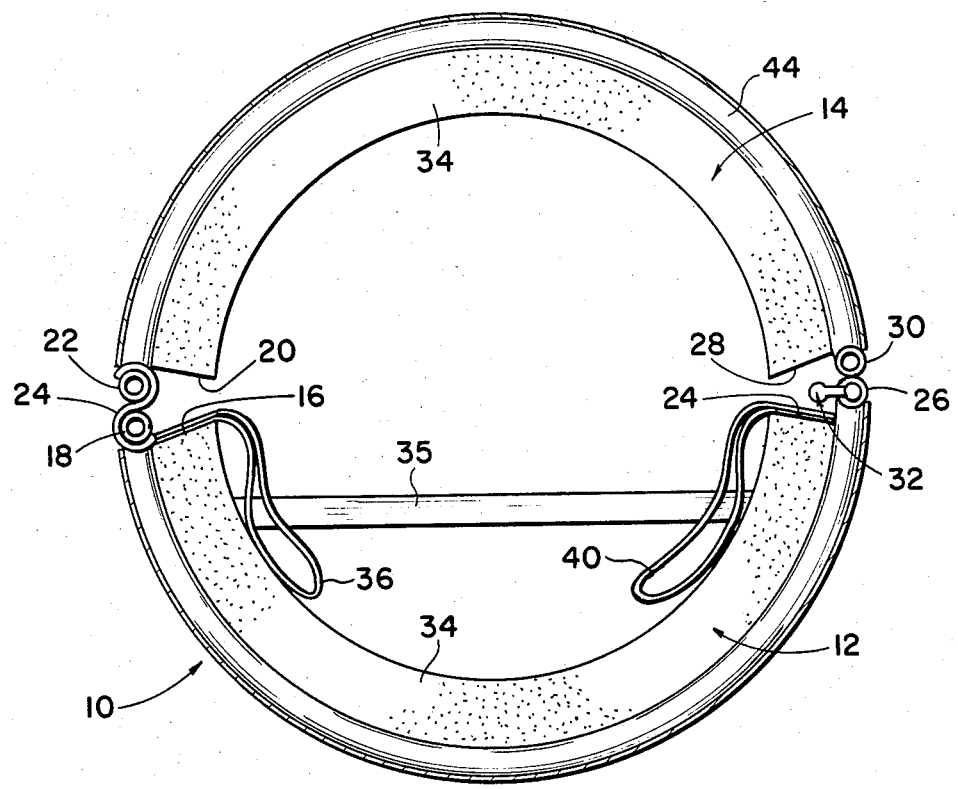
FIG. 2 is a view taken on line 2—2 of FIG. 1.
Figure 3:
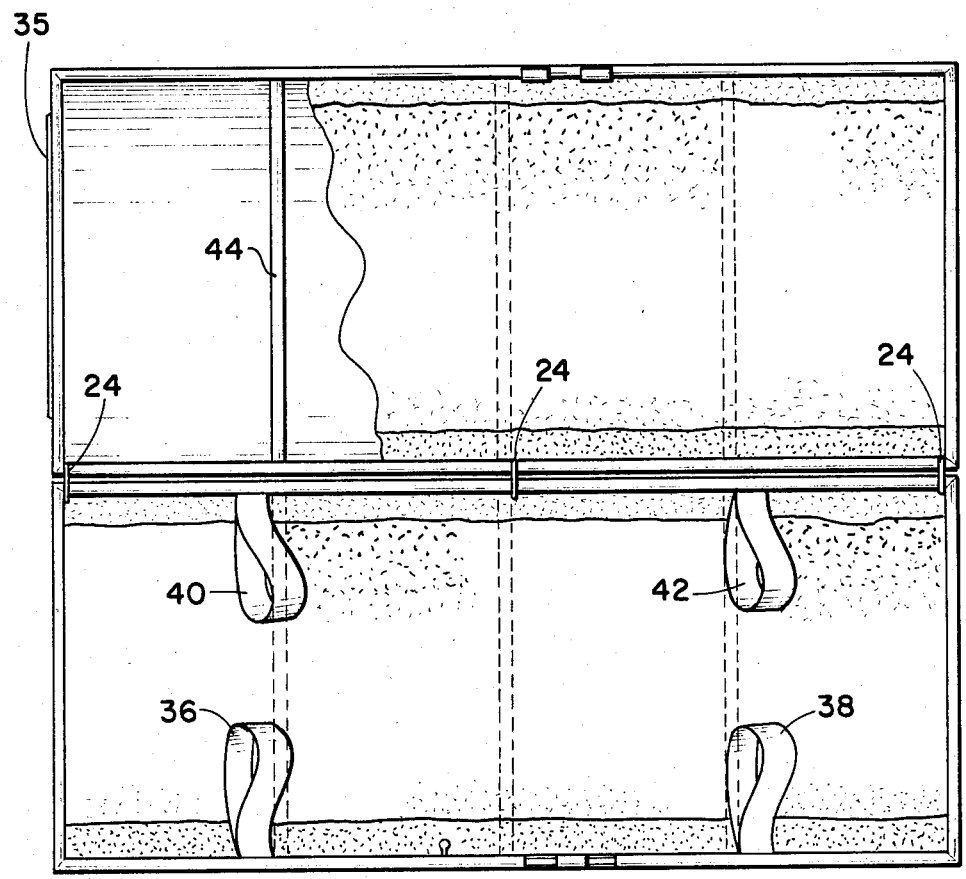
FIG. 3 is a plan view of a protective capsule embodying the invention and illustrates the open position thereof.
Figure 4:
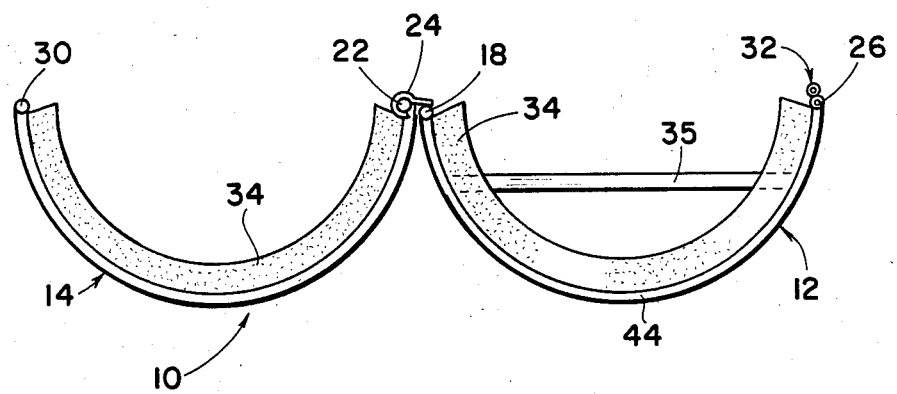
FIG. 4 is an end elevational view of a protective capsule embodying the invention in the open position thereof.

Referring to the drawings in detail, and particularly FIGS. 1 through 4, reference character 10 generally indicates a protective capsule comprising a first elongated half-section 12 having a substantially semi-circular cross-sectional configuration, and a second elongated half-section 14 having a substantially semi-circular cross-sectional configuration. The half-section 14 may be hingedly secured to the half-section 12 along one longitudinally extending edge 16 thereof in any suitable manner whereby the half-section 14 may be moved between a position of engagement with the half-section 12, as shown in FIGS. 1 and 2, and a position of at least partial disengagement therewith as shown in FIGS. 3 and 4. Whereas the sections 12 and 14 may be hingedly secured together in any suitable manner as shown herein the longitudinal edge 16 of the half-section 12 may be provided with a bar or tube means 18 extending therealong. The adjacent longitudinal edge 20 of the half-section 14 may be provided with a generally similar rod or tube means 22 extending therealong. A plurality of substantially S-shaped strap members 24 may be secured between the tubes 18 and 20 in longitudinally spaced relation for journalling the rods together whereby the rod 22 may move with respect to the rod 18 from the relative position therebetween as shown in FIG. 2 to the relative position therebetween as shown in FIG. 4. In this manner the half-sections 12 and 14 may be readily moved between open and closed positions for the capsule 10.

The diametrically disposed longitudinal edge 24 with respect to the edge 16 may be provided with a longitudinally extending rod or tube member 26 generally similar to the tube 18. The diametrically opposed longitudinal edge 28 with respect to the edge 20 may be provided with a longitudinally extending rod or tube 30 generally similar to the rod 22. In addition, suitable latching means generally indicated at 32 may be provided for cooperating between the rods or tubes 26 and 30 for selectively latching the rods together in the closed position of the capsule 10. The latching means 32 is readily accessible from the interior of the closed capsule 10 whereby the occupant of the capsule may easily and quickly latch the two half-sections 12 and 14 in the closed position, and conversely unlatch the half-sections 12 and 14 for opening of the capsule 10 as will be hereinafter set forth.

The inner periphery of each half section 12 and 14 is lined or covered with a suitable lining material 34. The lining material is sufficiently soft or yieldable as to cushion the shock of an occupant of the capsule 10 during use thereof, as will be hereinafter set forth, and is sufficiently buoyant as to provide for flotation of the capsule 10 in the event the capsule is cast into a body of water while being used. In addition, it is preferable to provide a bar means 35 extending transversely across each end of the half-section 12 for a purpose as will be hereinafter set forth.

The half-section 12 is provided with strap or belt means for securing the body of an occupant securely within the capsule 10. As shown herein a pair of straps 36 and 38 are secured to the half-section 12 in longitudinally spaced relation along one side edge 24 thereof. Each strap 36 and 38 has at least one end secured to the half-section 12 whereby the straps 36 and 38 may encircle a body portion of the occupant and the opposite end of the straps may be removably secured to the half-section 12 in the general manner as well known seat belts as used in automobiles, and the like. A second pair of straps 40 and 42 are similarly secured in longitudinally spaced relation along the side edge 16 for similar connection about a body portion of the occupant of the capsule 10. Of course, any suitable number of the straps or belts may be utilized as desired, and there is no intention of limiting the invention to the particular number and arrangement of straps as shown herein.

Each half-section 12 and 14 is provided with a plurality of longitudinally spaced roll bar means 44 secured around the circumference thereof. The roll bar means 44 may be disposed adjacent the inner periphery of the half-sections 12 and 14 or the outer periphery thereof, as desired, and provide additional protection for the occupant of the capsule 10.

In use, a person or occupant wishing to use the capsule 10 for protection against hazardous weather conditions, or the like, may position himself within the half-section 12 and secure himself therein by the use of the strap members 36, 38, 40 and 42 in the usual or well known manner. It is preferable that the occupant don a suitable helmet (not shown) prior to entering the capsule 10. The half-section 14 may then be pivoted about the hinge means 24 for closing the half-section 14 against the half-section 12. Of course, suitable handle means (not shown) may be provided on the half-section 14, if desired, for facilitating engagement thereof by the occupant of the capsule 10 during closing of the half-section 14 against the half-section 12. The latch means 32 may be manipulated for locking the half-section 14 in the closed position against the half-section 12. The feet of the occupant may press against the bar means 35. It is to be noted that suitable sealing means (not shown) may be interposed between the abutting longitudinal edges of the half-sections 12 and 14 for precluding leakage of fluid therebetween, although it is important that sufficient air flow be provided for assuring an adequate atmosphere for breathing of an occupant of the closed capsule 10. As hazardous conditions prevail about the exterior of the closed capsule 10, the occupant thereof will be safe from harm. In the event the capsule 10 is thrown about by the atmospheric conditions, such as during a tornado, or the like, the roll bar means 44 will protect the occupant from external forces and the yieldable material 34 will protect the occupant from bruises during such movement of the capsule. In the event the capsule 10 is cast into a body of water, the capsule 10 will float, thus also protecting the occupant from harm. Of course, when the dangerous external conditions have subsided or ceased, the occupant of the capsule 10 may release the atch means 32 and move the half-section 14 away from the engagement with the half-section 12. The strip means may be removed from engagement with the body portions of the occupant, and the occupant may leave the interior of the capsule 10.

It is to be noted that the protective capsule 10 may be utilized for protection of an occupant under a great many hazardous conditions. For example, in addition to storms, the device may be utilized for protection during an avalanche, an earthquake, a flood, or the like, and may further be utilized in connection with helicopter rescue in a war zone, or under emergency rescue operations.

Figure 6:
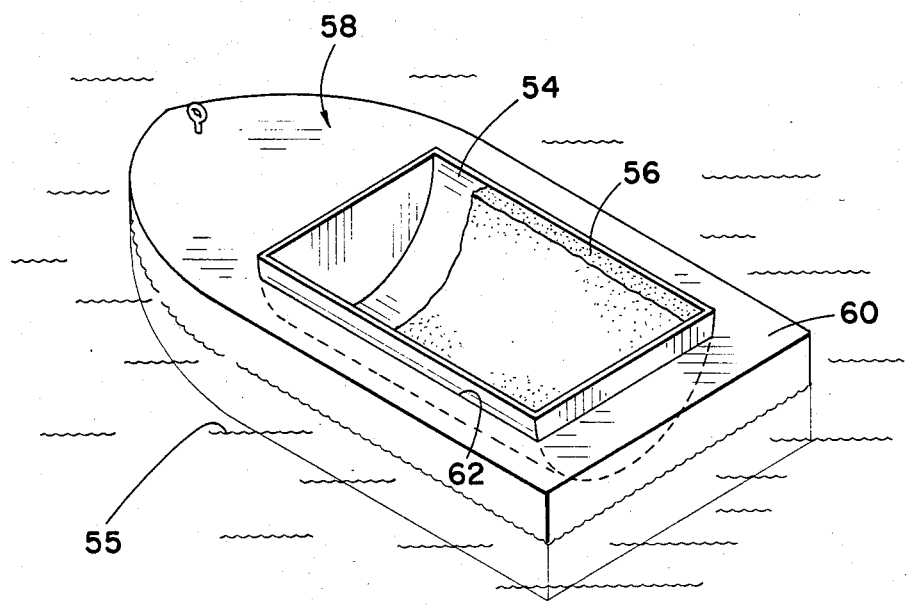
FIG. 6 is a perspective view of a modified, boat structure utilizing a form of a capsule embodying the invention.
Figure 5:
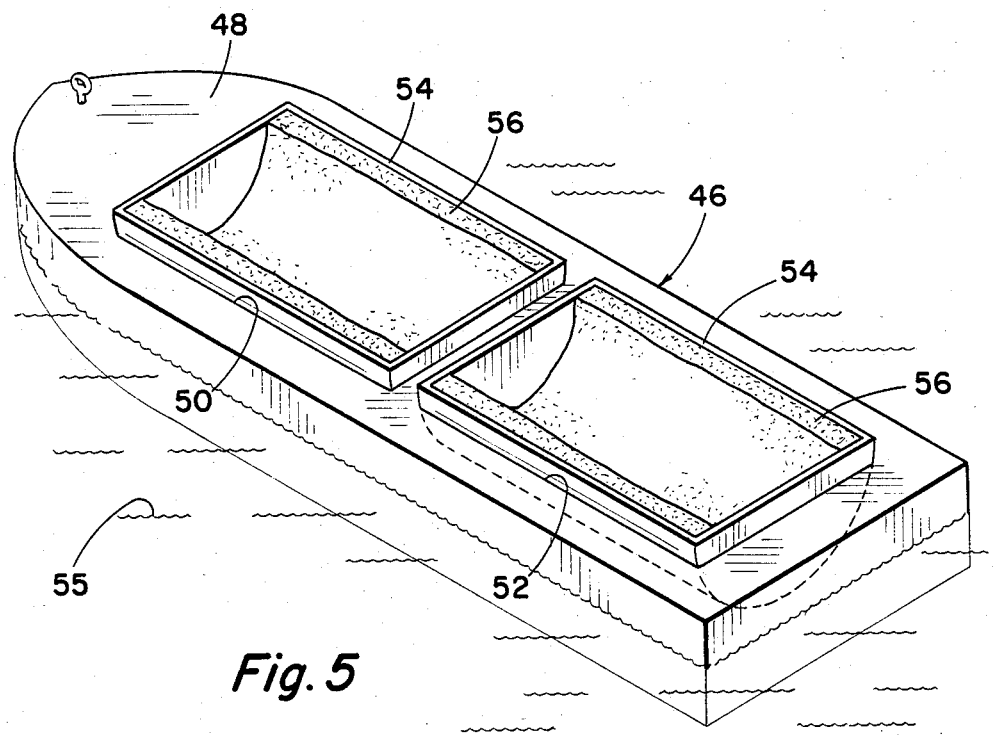
FIG. 5 is a perspective view of a boat structure utilizing a modified form of a capsule embodying the invention.

Referring now to FIGS. 5 and 6, a modified use of the half-sections 12 and/or 14 of the capsule 10 is shown. Reference numeral 46 generally indicates a boat structure comprising a hull 48 having a pair of longitudinally spaced and substantially aligned rectangular openings 50 and 52 provided in the upper surface thereof. A substantially semi-cylindrical capsule section 54 generally similar to the half-sections 12 or 14 may be disposed in each opening 50 and 52 in such a manner that the arcuate outer periphery of each half-section 54 is disposed in the body of water 55 in which the boat is placed. Each of the sections 54 may be provided with a lining material 56 generally similar to the material 34 thus not only providing a shock absorbing feature for the occupant of the boat, but providing the flotation for the boat 46 in and of itself. The arcuate configuration of the outer periphery of the sections 54 disposed in the water 55 resist any tendency of the boat 46 to turn over or capsize in the water in the event of turbulence, or the like.

Reference character 58 generally indicates a miniboat structure comprising a hull 60 which may be of substantially half the overall length of the normal-type boat hull 48. The hull 60 may be provided with a single substantially rectangular opening 62 in the upper surface thereof for receiving one of the capsules or sections 54 therein. The arcuate configuration of the outer periphery of the section 54 is disposed within the water 55 and resists any tendency of the hull 60 to capsize in the water as hereinbefore set forth in connection with the boat 46. In addition, the material 56 of the capsule section 54 provides flotation for the boat structure 58.

From the foregoing, it will be apparent that the present invention contemplates novel capsule means which embodies a plurality of uses, namely two substantially identical semi-cylindrical half sections may be hingedly secured together for closing into a body-encasing capsule for the protection of an occupant during hazardous ambient conditions, such as a tornado, or the like. In addition, each half-section is of a buoyant structure, and may be incorporated in a boat hull for providing not only the flotation force for the boat, but also providing a stabilizing structure to resist capsizing of the boat.

Whereas the present invention has been described in particular relation to the drawings attached hereto, it should be understood that other and further modifications, apart from those shown or suggested herein may be made within the spirit and scope of this invention.

What is claimed is:

1. A safety capsule comprising at least one substantially semi-cylindrical housing open along one longitudinal side for providing access to the interior thereof, yieldable and bouyant material provided on the inner periphery of the housing for protection of an occupant of the capsule and to provide flotation force for the housing;

a boat hull adapted to be disposed in water and having at least one opening provided in the upper surface thereof, said semi-cylindrical housing being disposed in said at least on·opening whereby the outer periphery of the housing is disposed within the water for providing resistance to capsizing of the boat hull and to provide a flotation force for the boat hull.

2. A safety capsule as set forth in claim 1 wherein the boat hull comprises a pair of longitudinally spaced substantially aligned openings in the upper surface thereof, and one of said semi-cylindrical housings is disposed in each of the openings whereby the outer periphery of each housing is disposed in the water for resistance of capsizing of the boat hull and to provide a flotation force for the boat hull.

3. A safety capsule comprising:

a housing having two semi-cylindrical housing sections having adjacent longitudinal side edges hingely secured together to provide alternate open and close position for the capsule and of a legnth to receive an occupant in a completely lying position;

yieldable and bouyant material provided on the inner periphery of the housing for protection of an occupant of the capsule and to provide flotation force for the housing;

a first and a second pair of straps secured along the longitudinal side of at least one of said semi-cylindrical sections;

latching means operable for selectively locking the two semi-cylindrical housing sections in the closed position thereof;

at least two spaced-apart ring shaped roll bars provided on the semi-cylindrical housing sections for protection of the occupant.

* * * * *

UNITED STATES PATENT AND TRADEMARK OFFICE
CERTIFICATE OF CORRECTION

PATENT NO. : 4,631,038

DATED : December 23, 1986

INVENTOR(S) : Betty J. Ritter

It is certified that error appears in the above-identified patent and that said Letters Patent is hereby corrected as shown below:

On the title page, inventor should read

--(76) Inventor: Betty J. Ritter --.

Signed and Sealed this

Thirty-first Day of March, 1987

Attest:

DONALD J. QUIGG

*Attesting Officer*  *Commissioner of Patents and Trademarks*